(12) United States Patent
Prakash (10) Patent No.: US 7,898,954 B2
(45) Date of Patent: Mar. 1, 2011

(54) POWER-EFFICIENT DATA RECEPTION IN A COMMUNICATION SYSTEM WITH VARIABLE DELAY

(75) Inventor: Rajat Prakash, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1062 days.

(21) Appl. No.: 10/969,155

(22) Filed: Oct. 20, 2004

(65) Prior Publication Data

US 2006/0083168 A1 Apr. 20, 2006

(51) Int. Cl.
*G01R 31/08* (2006.01)
*G06F 11/00* (2006.01)
*G08C 15/00* (2006.01)

(52) U.S. Cl. .................. 370/235; 370/237; 370/238; 370/252

(58) Field of Classification Search ............... 370/230, 370/237, 238, 252; 455/355
See application file for complete search history.

(56) References Cited

U.S. PATENT DOCUMENTS

| | | | | | |
|---|---|---|---|---|---|
| 5,550,808 | A | * | 8/1996 | Shimokoshi | 370/230 |
| 6,700,895 | B1 | * | 3/2004 | Kroll | 370/412 |
| 6,865,151 | B1 | * | 3/2005 | Saunders | 370/230 |
| 6,909,693 | B1 | * | 6/2005 | Firoiu et al. | 370/235 |
| 7,330,427 | B2 | * | 2/2008 | Rodriguez et al. | 370/230 |
| 7,450,926 | B2 | * | 11/2008 | Chang et al. | 455/343.4 |
| 2003/0210658 | A1 | * | 11/2003 | Hernandez et al. | 370/311 |
| 2003/0212535 | A1 | * | 11/2003 | Goel | 703/2 |
| 2004/0105401 | A1 | * | 6/2004 | Lee | 370/311 |

(Continued)

FOREIGN PATENT DOCUMENTS

EP 1202495 A2 5/2002

OTHER PUBLICATIONS

Eun-Sun Jung et al. "An energy efficient MAC protocol for wireless LANs" Proceedings IEEE Infocom 2002. The Conference on Computer Communications. 21st. Annual Joint Conference of the IEEE Computer andcommunications Societies. New York, NY, Jun. 23-27, 2002, Proceedings IEEE Infocom. The Conference on Computer Communica, vol. vol. 1 of 3. Conf. 21, Jun. 23, 2002, pp. 1756-1764, XP010593744.

International Search Report and Written Opinion - PCT/US2005/038108, International Search Authority - European Patent Office - May 2, 2005.

*Primary Examiner*—Chi H Pham
*Assistant Examiner*—Farah Faroul
(74) *Attorney, Agent, or Firm*—Sandip S. Minhas; Abdollah Katbab (57) ABSTRACT

To conserve power, a terminal operates in a "power save" mode in which the terminal is in a "doze" state when there is a low probability of receiving an incoming packet and in an "awake" state when an incoming packet is expected. In the doze state, the terminal powers down as much circuitry as possible. The terminal transitions between states based on an "ON" window. The window size and placement are determined based on statistics of packet arrival times. The terminal enters the awake state at the start of the ON window, turns on the receiver, and monitors for an incoming packet. The terminal turns off the receiver after receiving the packet, updates the statistics of the arrival times, and computes the window size and placement for the next incoming packet. The terminal may selectively enable or disable the power save mode based on jitter in the arrival times.

24 Claims, 8 Drawing Sheets

U.S. PATENT DOCUMENTS

| | | | |
|---|---|---|---|
| 2004/0117502 A1* | 6/2004 | Rosengard et al. | 709/236 |
| 2005/0003794 A1* | 1/2005 | Liu | 455/355 |
| 2005/0025194 A1* | 2/2005 | Adjakple et al. | 370/516 |
| 2006/0028984 A1* | 2/2006 | Wu et al. | 370/230 |
| 2006/0072586 A1* | 4/2006 | Callaway et al. | 370/395.62 |
| 2006/0080459 A1* | 4/2006 | Nanri | 709/237 |
| 2008/0125190 A1* | 5/2008 | Jan et al. | 455/574 |
| 2009/0059827 A1* | 3/2009 | Liu et al. | 370/311 |

* cited by examiner

POWER-EFFICIENT DATA RECEPTION IN A COMMUNICATION SYSTEM WITH VARIABLE DELAY

BACKGROUND

I. Field

The present invention relates generally to communication, and more specifically to techniques for receiving data in a communication system with variable delay.

II. Background

Communication systems are widely deployed to provide various communication services such as voice, packet data, and so on. Each type of service may have different characteristics and requirements. For example, a packet data call is typically busty in nature but is often able to tolerate a variable amount of delay. Data packets may thus be transmitted whenever they are generated and based on the availability of system resources. In contrast, a voice call typically generates voice data continually within a range of rates and has a relatively stringent delay requirement.

A high-speed multiple-access communication system may be able to concurrently support different types of calls for different users. For a voice call, a terminal may receive voice data packets at regular time intervals, e.g., one packet every 20 milli-seconds (ms). However, the actual amount of time spent receiving a packet may be small (e.g., less than 1 ms) and may be just a fraction of the time interval between packets. The terminal typically does not know the exact arrival times of incoming packets due to various reasons such as the variable delay observed by these packets. In this case, the terminal may continually monitor the communication channel for incoming packets in order to ensure that all packets are received.

A terminal may be a portable unit (e.g., a handset) that is powered by an internal battery. For such a terminal, continual monitoring of the communication channel depletes battery power and shortens both the "standby" time between battery recharges and the "on" time for active communication. It is highly desirable to minimize power consumption, to the extent possible, in order to extend battery life.

There is therefore a need in the art for techniques for efficiently receiving data in a communication system with variable delay.

SUMMARY

Techniques for receiving data in a power-efficient manner are described herein. These techniques may be used for various wireless and wireline communication systems and networks having variable delay. These techniques may also be used for various types of call in which data is sent at regular time intervals or at known time instants but encounters variable delay in transmission.

To conserve power, a terminal may operate in a "power save" mode in which the terminal is in a "doze" state when there is a low probability of receiving an incoming packet and in an "awake" state when an incoming packet is expected. In the doze state, the terminal may power down as much circuitry as possible to reduce power consumption. The terminal may transition from the doze state to the awake state based on an "ON" window. The size and placement of the ON window may be determined based on statistics of arrival times of packets previously received by the terminal. The start of the ON window is such that the probability of receiving a packet prior to this time instant is low or below a predetermined threshold. The terminal enters the awake state at the start of the ON window, turns on the receiver, and monitors for an incoming packet. The terminal turns off the receiver after receiving the packet, updates the statistics of the packet arrival times, computes the size and placement of the ON window for the next incoming packet, and enters the doze state until the start of the ON window. The process is repeated for each incoming packet.

The terminal may selectively enable and disable the power save mode. For example, if there is a large variation in the arrival times of the packets (i.e., a large jitter), then the terminal may disable the power save mode and turn on the receiver at all times in order to avoid missing packets. The terminal continues to monitor the statistics of the received packets and may enable the power save mode when the variation in the arrival times is small (i.e., low jitter).

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The power-efficient data reception techniques described herein may be used for various communication systems and networks and for various types of call. For clarity, these techniques are specifically described below for a voice call in a communication system that includes a wireless network.

Figure 1:
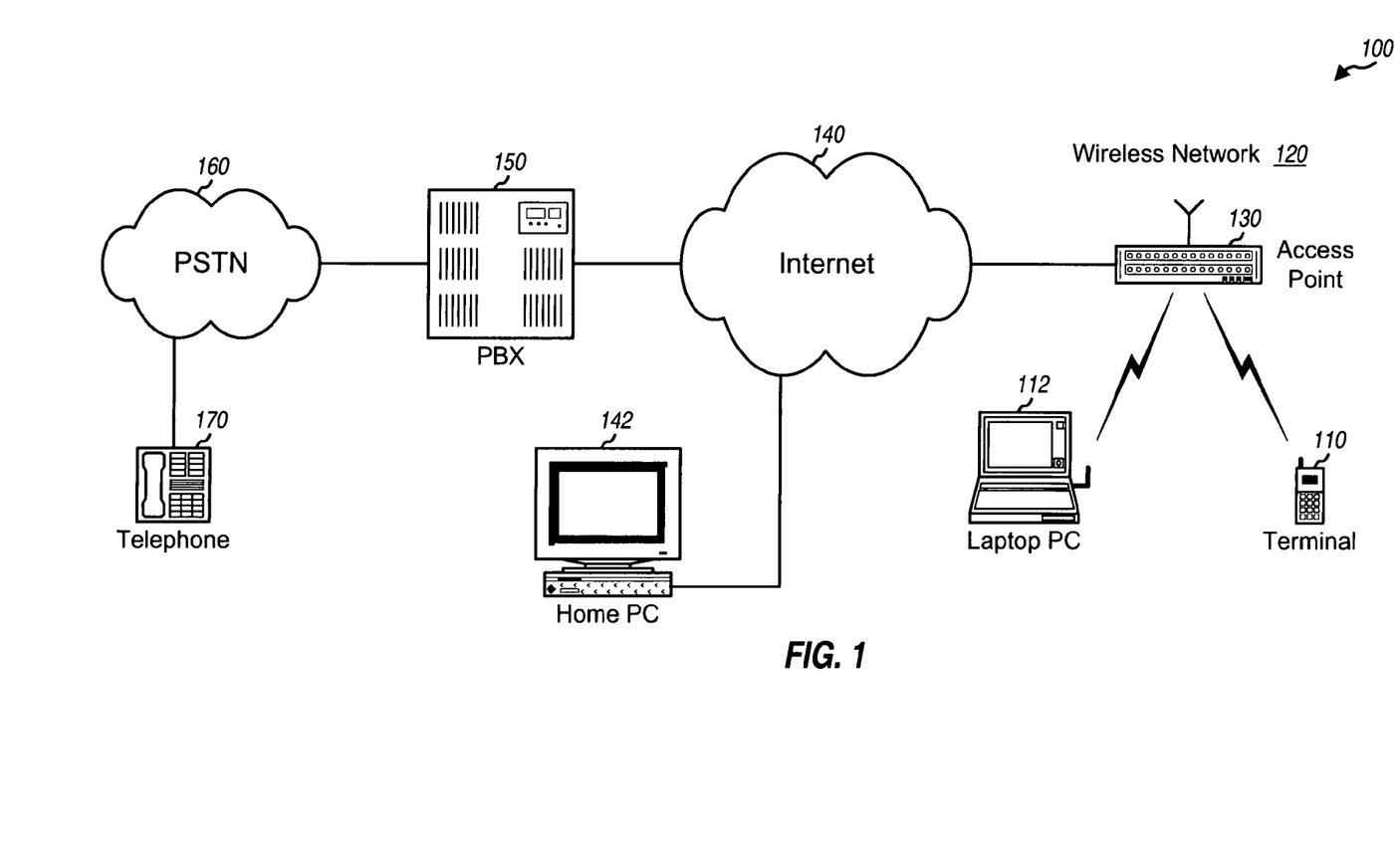
FIG. 1 shows multiple communication networks used for a voice call.

FIG. 1 shows a communication system 100 comprised of multiple communication networks that interoperate together but are otherwise independent of one another. A terminal 110 communicates with a telephone 170 via communication system 100 for a voice call. Terminal 110 exchanges data with an access point 130 within a wireless network 120. Wireless network 120 may provide wireless communication for any number of terminals such as terminal 110 and a laptop personal computer (PC) 112. Access point 130 also exchanges data with other remote entities via Internet 140. Other entities may also exchange data via Internet 140, such as a home PC 142. Telephone 170 communicates with a public switch telephone network (PSTN) 160, which supports voice communication for conventional plain old telephone system (POTS). A private branch exchange (PBX) 150 couples to PSTN 160 and Internet 140, routes inbound voice and data calls to the appropriate destinations, and facilitates the exchange of telephony and data between end-users (e.g., at terminal 110 and telephone 170). Although not shown in FIG. 1, both ends of a call may be voice-over-IP (VoIP). For example, terminal 110 may communicate with another terminal that couples to the Internet 140 either directly or via another wireless or wireline network.

Terminal 110 may be fixed or mobile and may also be called a mobile station, a station, a wireless device, user equipment, or some other terminology. Terminal 110 may also be a portable unit such as a cellular phone, a handheld device, a wireless module, a personal digital assistant (PDA), and so on.

Wireless network 120 may be a wireless local area network (WLAN) that provides communication coverage for a limited geographic area. For example, wireless network 120 may be (1) an IEEE 802.11 wireless network that implements an IEEE 802.11 standard (e.g., 802.11a, b, g, h and so on) or (2) a Bluetooth personal area network (BT-PAN) that employs Bluetooth wireless technology. Wireless network 120 may also be a wireless wide area network (WWAN) that provides communication coverage for a large geographic area. For example, wireless network 120 may be a Code Division Multiple Access (CDMA) network, a Time Division Multiple Access (TDMA) network, a Frequency Division Multiple Access (FDMA) network, and so on. A CDMA network may implement one or more CDMA standards such as IS-2000, IS-856, IS-95, Wideband-CDMA (W-CDMA), and so on. A TDMA network may implement one or more TDMA standards such as the Global System for Mobile Communications (GSM). These various standards are known in the art. In general, wireless network 120 may be any wireless network. For clarity, the following description assumes that wireless network 120 is an IEEE 802.11 wireless network.

Figure 2:
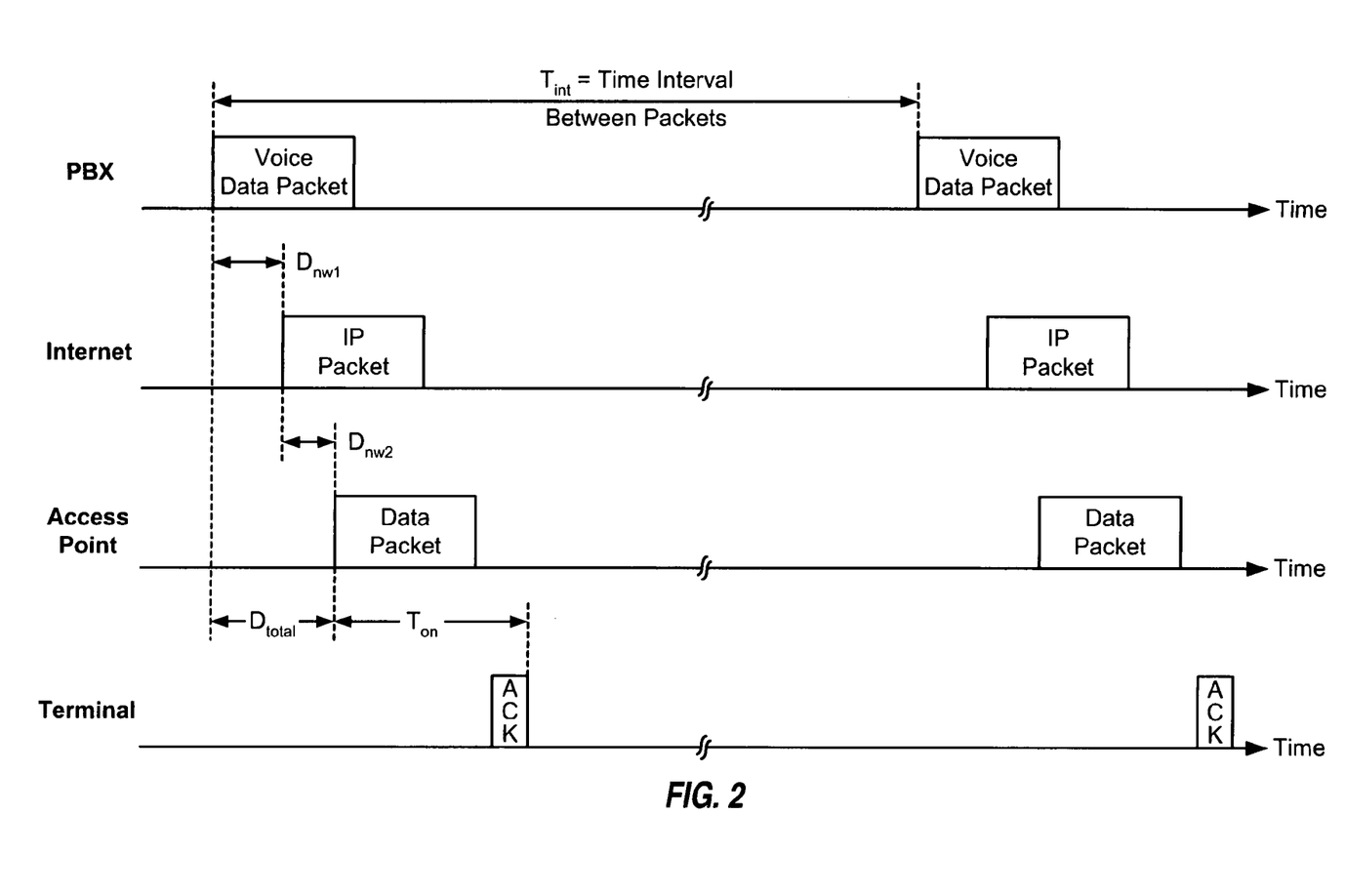
FIG. 2 shows data transmission from a PBX to a terminal for the voice call.

FIG. 2 shows data transmission from PBX 150 to terminal 110 for the voice call. For far-end speech, PBX 150 acts as a voice server for the voice call, receives an analog voice signal from telephone 170 via PSTN 160, and digitizes the analog voice signal to obtain data samples. A voice encoder (vocoder) within PBX 150 receives the data samples and generates voice data packets at regular time intervals, e.g., one packet every 20 ms. In general, the time interval between voice data packets is determined by the encoding scheme used for the voice call. PBX 150 sends the voice data packets, as they are generated, via Internet 140 toward terminal 110. These voice data packets may be sent as Internet Protocol (IP) packets.

Internet 140 may be any data network and may include any number of routers and/or other network entities that receive, process, and forward packets. Internet 140 receives the voice data packets from PBX 150 and forwards these packets to wireless network 120, typically in the same manner as any other IP packets. Internet 140 introduces variable delay to the voice data packets from PBX 150, with the amount of delay and the variability in the delay being determined by traffic loading within Internet 140 and possibly other factors.

Access point 130 receives the voice data packets from Internet 140, generates a physical layer (PHY) protocol data unit (PPDU) (or simply, a data packet) for each voice data packet, and transmits each data packet via a wireless channel to terminal 110. Access point 130 typically operates in a mode in which the access point transmits packets to terminal 110 as they are received via Internet 140, subject to the availability of system resources at the access point. Access point 130 may thus transmit each voice data packet immediately as soon as the packet is received, if no other packets need to be transmitted before this packet. Access point 130 may also queue voice data packets if other packets need to be sent first and may then transmit each queued packet as resources become available and in the order in which the queued packets were received by the access point. Wireless network 120 thus introduces additional variable delay to the voice data packets sent by PBX 150, with the amount and variability of the delay being determined by traffic loading at the wireless network and possibly other factors.

In FIG. 2, the delay experienced by each voice data packet via Internet 140 is denoted as $D_{nw1}$, which may vary from packet to packet. The delay experienced by each packet via wireless network 120 is denoted as $D_{nw2}$, which may also vary from packet to packet. Terminal 110 receives each voice data packet from PBX 150 via Internet 140 and access point 130 after a total delay of $D_{total}=D_{nw1}+D_{nw2}$. In general, the total delay experienced by each packet received by terminal 110 is dependent on the delay introduced by each network via which the packet travels from PBX 150 to get to terminal 110.

Terminal 110 decodes each data packet received from access point 130, determines whether the packet is decoded correctly (good) or in error (erased), and sends back an acknowledgment (ACK) if the packet is decoded correctly and a negative acknowledgment (NAK) if the packet is erased. For IEEE 802.11b, access point 130 may transmit each data packet at any data rate ranging from 1 mega bits per second (Mbps) to 11 Mbps, depending the channel condition. The total amount of time ($T_{on}$) to transmit a data packet to terminal 110 and to receive an ACK at access point 130 may be less than 0.3 ms for the highest data rate supported by IEEE 802.11b. This total transmission time represents a small fraction of the time interval between voice data packets generated by PBX 150. The total transmission time for other IEEE 802.11 standards (e.g., IEEE 802.11a, g, and h) is also relatively small.

To reduce power consumption, terminal 110 may operate in the power save mode, which attempts to power up the receiver and transmitter for only a fraction of the time interval between voice data packets. In the power save mode, terminal 110 enters the doze state whenever there is a low probability of receiving an incoming packet from access point 130. In the doze state, terminal 110 may power down as much circuitry as possible to conserve battery power. For example, terminal 110 may power down the receiver and transmitter circuitry but maintain the memory and oscillator active. Terminal 110 may transition from the doze state to the awake state prior to the time an incoming packet is expected to be received from access point 130. The power save mode reduces the average power consumption for terminal 110.

The power save mode may be implemented in various manners. In an embodiment, an ON window is used to transition from the doze state to the awake state. The ON window is placed at a future time instant where the next data packet is expected to be received. The ON window has a size (i.e., a duration or width) that is selected based on the uncertainty in when the next data packet may arrive at terminal 110. The window size and placement are thus dependent on statistics applicable to the next incoming packet. Terminal 110 is in the doze state when the ON window is low and in the awake state when the ON window is high.

Figure 3:
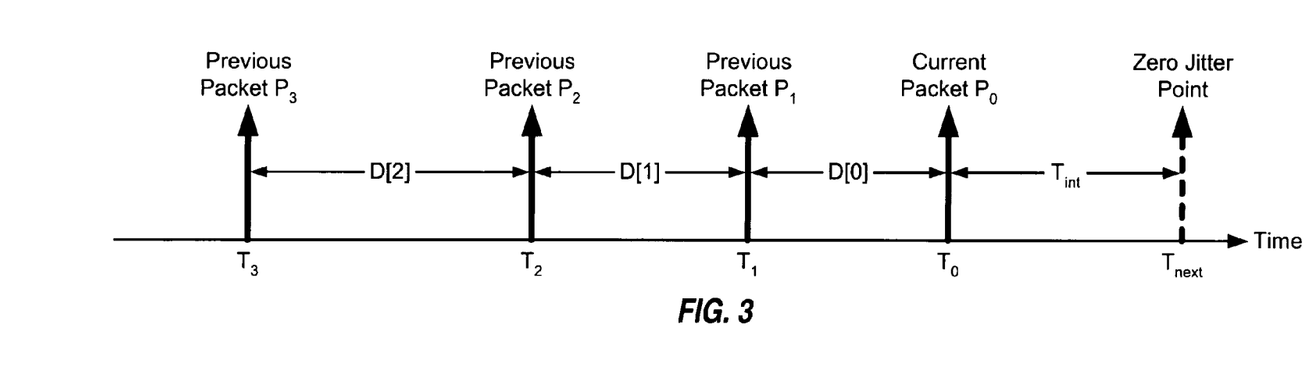
FIG. 3 shows a stream of data packets received by the terminal.

FIG. 3 shows a stream of data packets received by terminal 110 from access point 130 for the voice call. The time instant at which each data packet is received by terminal 110 is represented by a heavy up-arrow. As shown in FIG. 3, terminal 110 receives previous packet $P_3$ at time $T_3$, previous packet $P_2$ at time $T_2$, previous packet $P_1$ at time $T_1$, and current packet $P_0$ at time $T_0$. The inter-arrival time $D[x]$ for a given packet $P_x$ is the difference between the arrival time $T_x$ of packet $P_x$ and the arrival time $T_y$ of the next earlier packet $P_y$, or $D[x]=T_x-T_y$. The inter-arrival time offset (or simply, time offset) $d[x]$ for a given packet $P_x$ is the difference between the inter-arrival time $D[x]$ for packet $P_x$ and the expected time interval $T_{int}$ between packets $P_x$ and $P_y$, or $d[x]=D[x]-T_{int}$, which is $d[x]=D[x]-20$ for the case in which data packets are sent every 20 ms for the voice call. The time offset $d[x]$ may be more efficiently stored than the inter-arrival time $D[x]$. However, both parameters $d[x]$ and $D[x]$ convey essentially the same information.

In an ideal case, PBX 150 generates and sends a voice data packet every 20 ms, Internet 140 introduces a constant delay, access point 130 receives a voice data packet every 20 ms and transmits a corresponding data packet every 20 ms (with a fixed delay), and terminal 110 receives a data packet every 20 ms. For this ideal case, the inter-arrival time for each data packet is equal to the expected time interval (i.e., $D[x]=T_{int}$) and the time offset is equal to zero (i.e., $d[x]=0$). Terminal 110 would then know when each new data packet will be sent by access point 130. Terminal 110 may then enter the doze state for much of the time between consecutive data packets and transition to the awake state just before the arrival of the next data packet in order to receive this packet.

In most cases, terminal 110 does not receive data packets at precisely spaced time intervals. This may be due to PBX 150 not generating or sending voice data packets every 20 ms, Internet 140 introducing variable delay (e.g., due to varying Internet traffic load), access point 130 introducing additional variable delay (e.g., due to different loading conditions), and so on. To ensure that the next incoming data packet will be received, terminal 110 may wake up prior to the time this packet is expected to be received, based on the ON window. The window size and placement may be determined in various manners.

In a first embodiment, the ON window is placed at a zero jitter point and has a size determined by the inter-arrival times of the current and previous data packets. The zero jitter point is the time instant where the next incoming packet is expected to be received with zero jitter, which means that the delay for the next incoming packet is the same as the delay for the current packet. For the voice call with $T_{int}=20$, the zero jitter point is 20 ms from the arrival time $T_0$ of the current packet, or $T_{next}=T_0+20$. When jitter is zero, terminal 110 can wake up just before the zero jitter point and receive the next data packet. However, because of jitter, the next data packet may arrive sooner than the zero jitter point. Terminal 110 is thus powered up for some amount of time prior to the zero jitter point.

Figure 4:
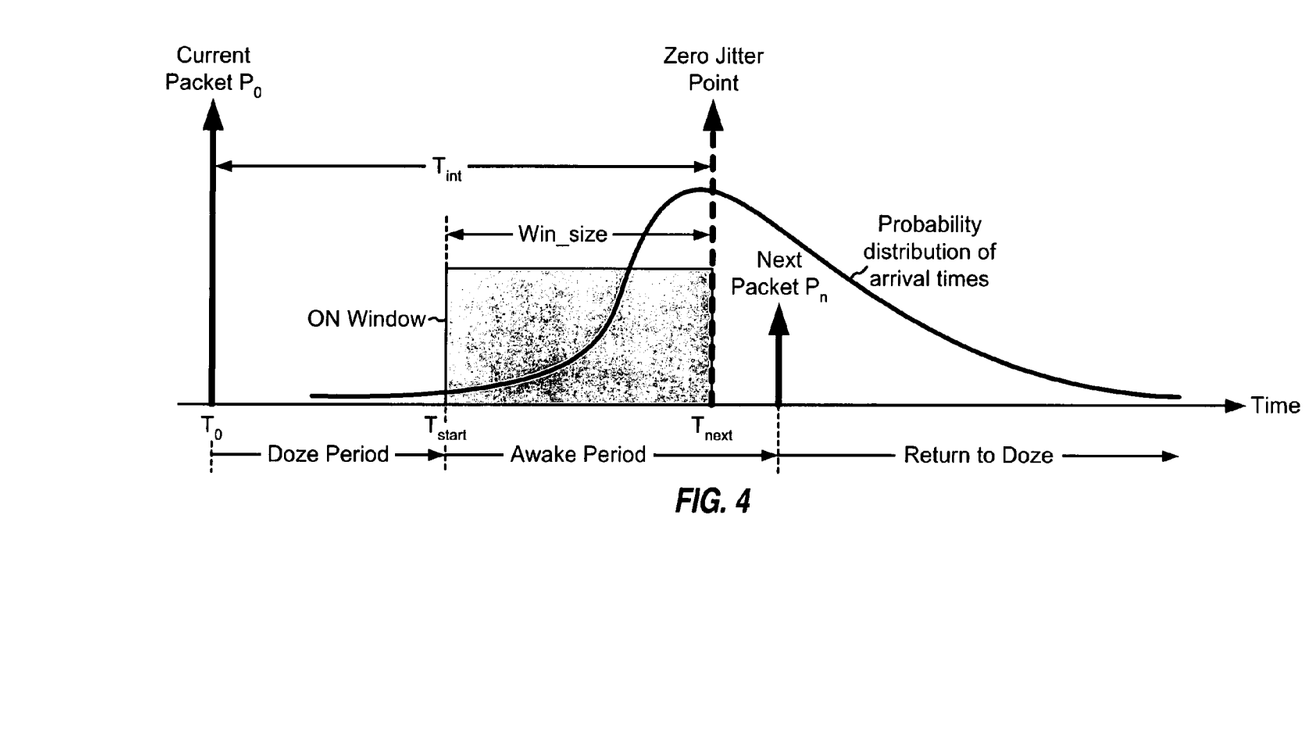
FIG. 4 shows a probability distribution of inter-arrival times for data packets and a first embodiment to determine placement of the ON window.

FIG. 4 shows an exemplary probability distribution of the inter-arrival times for data packets received by terminal 110. This probability distribution may be obtained by receiving incoming packets, determining the inter-arrival time of each received packet, and computing the probabilities for different inter-arrival times. In general, different probability distributions may be obtained for different communication networks, different loading conditions, and so on. FIG. 4 shows that there is a good likelihood of the next data packet arriving before the zero jitter point.

FIG. 4 also shows the placement of the ON window in accordance with the first embodiment. The ON window is placed such that the right edge of the window is at the zero jitter point. The ON window then extends from the zero jitter point toward the arrival time $T_0$ of the current packet.

The window size may be determined based on the time offsets of the current and previous data packets, as follows:

$$Win\_size=Min\_size+\max(d[0],0)+ \ldots +\max(d[Num\_pac-1],0), \quad \text{Eq (1)}$$

where

Min_size is a minimum window size;

Num_pac is the number of data packets to consider in computing the window size;

max (a, b) gives the maximum of the two arguments a and b; and

Win_size is the size of the ON window.

Equation (1) computes the window size in a manner to take into account the transmission characteristics of typical networks. If there is no congestion in the networks between PBX 150 and terminal 110, then voice data packets are sent by PBX 150 at regular time intervals and data packets are also received by terminal 110 at regular intervals. If there is congestion in Internet 140 and/or wireless network 120, then each congested network may queue packets and send them out as soon as possible. The amount of delay experienced by each packet through each network is thus dependent on the amount of queuing delay for that packet in that network. A longer delay through a given network may be largely due to a longer queuing delay at that network, which may indicate increasing congestion in the network. When the congestion clears, the network may send out all packets in the queue in rapid succession. A data packet that arrives past its zero jitter point at terminal 110 may thus indicate increasing congestion at one or more networks. This late arriving packet may also indicate that future data packets may arrive early, if the congestion at each previously congested network clears and the network is able to flush out the packets in its queue.

In equation (1), the term max ($d[x]$, 0), for $x=0 \ldots (Num\_pac-1)$, affects the window size if the previous packet $P_x$ arrived later than its zero jitter point, which may suggest a buildup in delay. The late arrival of previous packets may suggest that the next packet may arrive earlier than the zero jitter point for the reason described above, and the ON window may thus be increased. Summing all of the terms max ($d[0]$, 0) through max ($d[Num\_pac-1]$, 0) allows the ON window to grow when multiple previous packets are delayed more than normal and arrive after their zero jitter points.

For example, increasing congestion in wireless network 120 may cause previous packet $P_2$ to be delayed by 5 ms past its zero jitter point, previous packet $P_1$ to be delayed by 2 ms past its zero jitter point, and the current packet $P_0$ to be delayed by 4 ms past its zero jitter point. This results in the current packet $P_0$ observing a buildup of 11 ms of total delay. If the congestion in wireless network 120 clears, then the next packet may be sent without any delay, or 9 ms after the current packet. With equation (1), the delays of the late arriving packets are accumulated, and the window size is extended accordingly. For the above example, the window size would be 11 ms with Num_pac=3, and would then start 9 ms from the arrival time $T_0$ of the current packet. This allows terminal 110 to catch the next incoming packet even if this packet is sent without any queuing delay.

The minimum window size (Min_size) ensures that the ON window starts some time before the zero jitter point. In a truly zero jitter environment, terminal 110 may use this time to wake up from the doze state, warm up the analog circuitry, and initialize the digital circuitry for receiving the next incoming packet. The minimum window size is mainly for circuit warm up time but may also be used to account for various sources of inaccuracy. If the measured packet arrival time corresponds to the time that packet reception was complete, then the minimum window size should be greater than (the time reception is complete minus the time reception begin), which depends on the duration of packet transmission and hence the actual communication system. The minimum window size may be set to 3 ms or some other value.

The ON window may be made larger by increasing the minimum window size (Min_size) and/or the number of packets (Num_pac) used to compute the window size. The number of data packets may be set to three (Num_pac=3) or some other value. A larger window size reduces the likelihood of missing an incoming packet due to early arrival. A larger window size also increases the time that terminal 110 is powered on and thus increases power consumption. An appropriate tradeoff may be made between the dual goals of not missing incoming packets and saving power. Appropriate values may then be selected for Min_size and Num_pac to achieve the desired goals.

Equation (1) is based on a conservative design that "penalizes" late arriving packets but ignores early arriving packets in determining the window size. The max (d[x], 0) operation provides (1) a positive value if packet $P_x$ arrives later than its zero jitter point, in which case the time offset d[x] is greater than zero, and (2) a zero value if packet $P_x$ arrives early or on time. The window size is increased by the positive values for all late arriving packets, whereas the zero values for early and on-time packets have no effect on the window size. This results in a larger and more conservative window size to ensure catching the next incoming packet.

The window size may also be computed in a manner to take into account both early and late arriving packets, as follows:

$$Win\_size=Min\_size+d[0]+\ldots+d[Num\_pac-1]. \quad \text{Eq (2)}$$

Equation (2) can catch fluctuations in delay, e.g., due to changes in loading conditions at a network. For example, terminal 110 may receive previous packet $P_2$ 5 ms past its zero jitter point, previous packet $P_1$ 2 ms before its zero jitter point, and current packet $P_0$ 4 ms past its zero jitter point. The total delay for the current packet $P_0$ is then 7 ms. If the congestion in the network clears, then the next packet may be sent without any delay, or 13 ms after the current packet. With equation (2), the time offsets of packets $P_0$ through $P_2$ are accumulated to obtain 7 ms, and the window size is extended accordingly and starts 13 ms from the arrival time $T_0$ of the current packet. A more conservative value may be used for Min_size in equation (2) to account for the more aggressive manner in computing the window size.

As shown in FIG. 4, the start time $T_{start}$ corresponding to the start of the ON window may be computed as follows:

$$T_{start}=T_0+T_{int}-Win\_size, \quad \text{Eq (3)}$$

where $T_{next}=T_0+T_{int}$ is the zero jitter point. Terminal 110 may enter the doze state after receiving the current packet. Terminal 110 powers up at the start of the ON window, transitions to the awake state, and starts monitoring for the next incoming packet. Terminal 110 remains in the awake state until the next packet $P_n$ is received. Terminal 110 then computes the ON window for the following packet, taking into account the inter-arrival time D[n] of Packet $P_n$, and then returns to the doze state.

In a second embodiment, the window size and placement are determined based on computed statistics for packets received by terminal 110. For example, an average inter-arrival time, $D_{avg}$, for Num_pac most recently received packets may be computed as follows:

$$D_{avg} = \frac{1}{Num\_pac} \cdot \sum_{x=0}^{Num\_pac-1} D[x]. \quad \text{Eq (4)}$$

The expected arrival time of the next incoming packet may then be computed as:

$$T_{next}=T_0+D_{avg}. \quad \text{Eq (5)}$$

The standard deviation of the inter-arrival times, Std_dev, for the Num_pac most recently received packets may be computed as follows:

$$Std\_dev = \sqrt{\frac{1}{Num\_pac} \cdot \sum_{x=0}^{Num\_pac-1} (D[x] - D_{avg})^2}. \quad \text{Eq (6)}$$

The window size may then be computed based on the standard deviation of the inter-arrival times, e.g., as follows:

$$Win\_size=Scale \times Std\_dev, \quad \text{Eq (7)}$$

where Scale is a scaling factor and may be equal to 2, 3, or some other integer or non-integer value.

Figure 5:
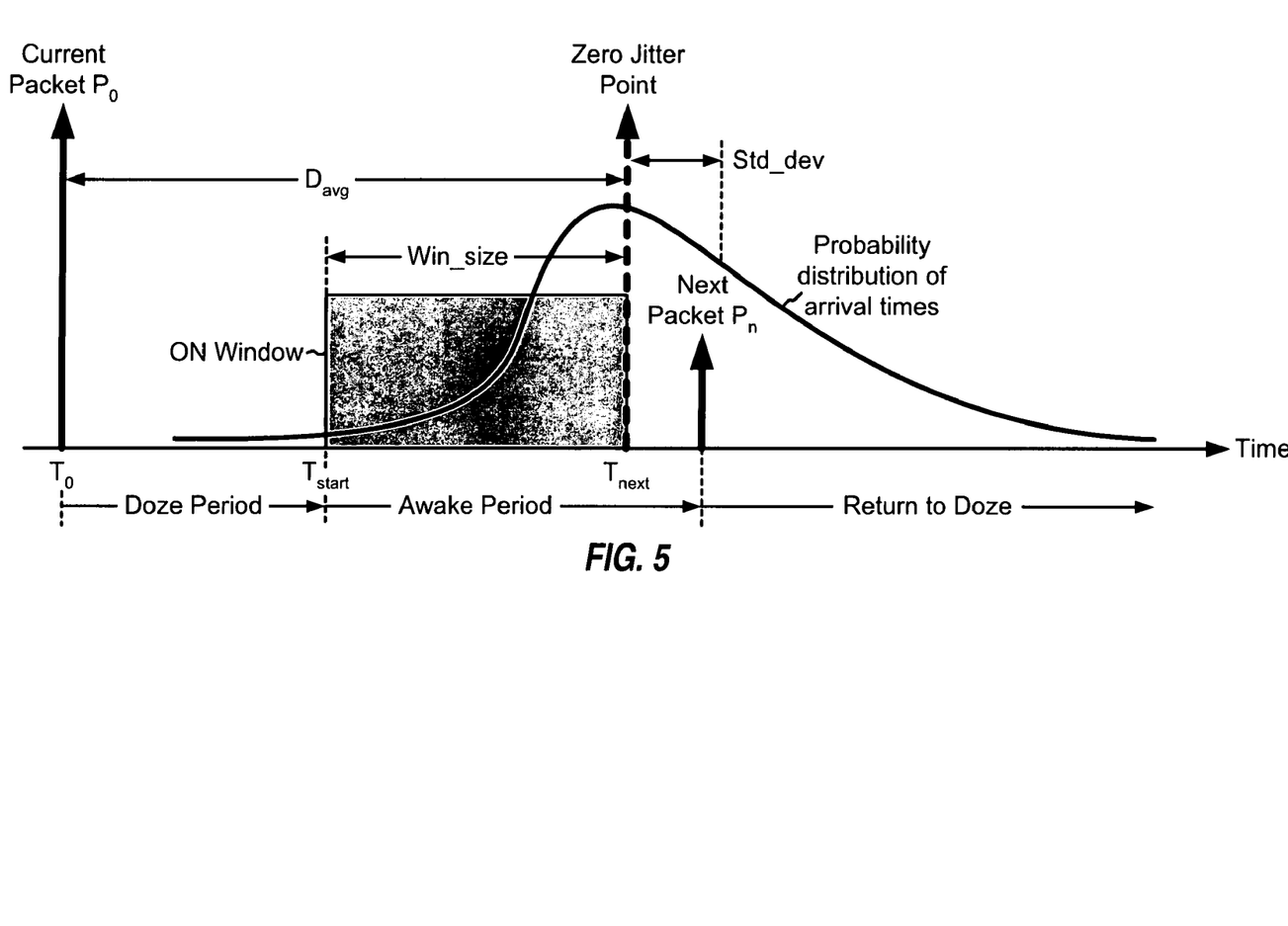
FIG. 5 shows a second embodiment to determine window size and placement.

FIG. 5 shows the determination of the window size and placement for the second embodiment. The expected arrival time of the next packet is computed based on the arrival time $T_0$ of the current packet and the average inter-arrival time $D_{avg}$, as shown in equations (4) and (5). The window size is computed based on the standard deviation, as shown in equations (6) and (7). The ON window is placed such that the right edge is aligned at the expected arrival time, $T_{next}$, for the next packet. The ON window extends toward the arrival time $T_0$ of the current packet and covers Scale times the standard deviation. If the probability distribution is known, then the Scale value may be selected to achieve a desired probability of catching the next incoming packet.

Two embodiments for determining the window size and placement have been described above. The first embodiment derives the window size and placement using only additions (which greatly simplifies implementation) and provides good data reception performance for typical networks. The second embodiment may provide good performance for certain traffic characteristics. For example, if the inter-arrival times are uncorrelated, then the problem reduces to a more classical problem for which the standard deviation is a well accepted solution. The window size and placement may also be determined in other manners and using other criteria, and this is within the scope of the invention. In general, the window size may be determined based on any function of the time offset d[x] or the inter-arrival time D[x] for any number of packets. For example, equation (1) may include a scale factor for each of the time offsets d[x]. The window size may also be determined based on other criteria such as, for example, power availability (more aggressive window may be used when power is limited), channel measurement (less aggressive window may be used when signal quality is weak), and so on.

Figure 6:
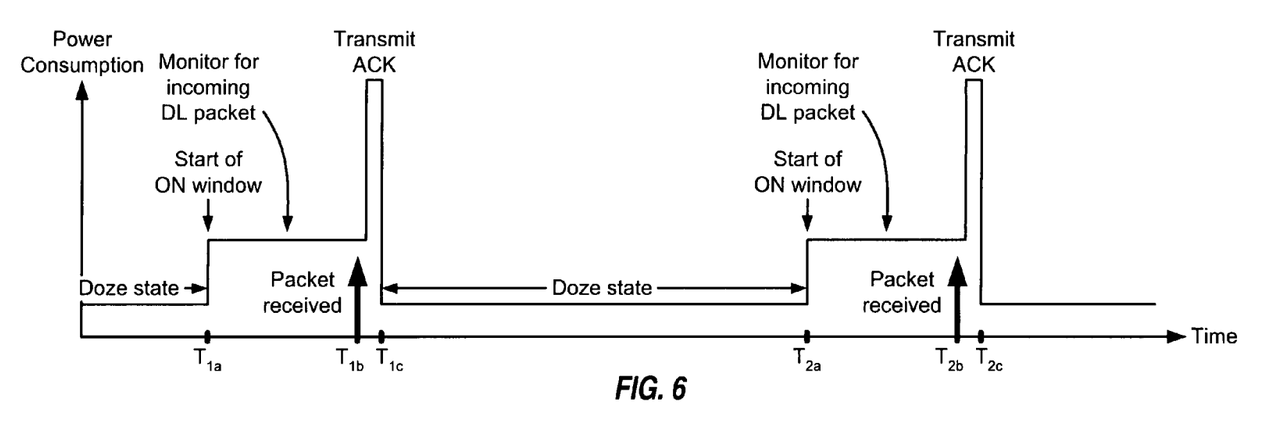
FIG. 6 shows data reception at the terminal in the power save mode.

FIG. 6 shows data reception at terminal 110 in the power save mode. At time $T_{1a}$, which corresponds to the start of the ON window, terminal 110 wakes up from the doze state, enters the awake state, turns on the receiver, and monitors for an incoming packets. At time $T_{1b}$, terminal 110 receives an incoming packet, decodes the packet, determines that the packet is decoded correctly, and transmits an ACK back to access point 130. At time $T_{1c}$, terminal 110 determines the ON window for the next incoming packet, turns off the transmitter and receiver, and enters the doze state. At time $T_{2a}$, which corresponds to the start of the ON window, terminal 110 wakes up from the doze state, enters the awake state, turns the receiver back on, and monitors for incoming packets. At time $T_{2b}$, terminal 110 receives an incoming packet, decodes the packet, determines that the packet is decoded correctly, and transmits an ACK. At time $T_{2c}$, terminal 110 determines the ON window for the following packet, turns off the transmitter and receiver, and enters the doze state.

For a two-way voice call, terminal 110 receives incoming packets on the downlink (DL) and transmits outgoing packets on the uplink (UL). The downlink (or forward link) refers to the communication link from the access point to the terminal, and the uplink (or reverse link) refers to the communication link from the terminal to the access point. For near-end speech, terminal 110 transmits voice data packets to PBX 150 for forwarding to telephone 170. A vocoder within terminal 110 generates a voice data packet every 20 ms. Terminal 110 may transmit each voice data packet as soon as the packet is generated by the vocoder. Alternatively, terminal 110 may attempt to align the transmission of the outgoing packet with the reception of the next incoming packet, so that the terminal is powered on for as short a time period as possible.

Terminal 110 may transmit voice data packets using normal procedures for transmitting on the uplink. For example, IEEE 802.11 requires terminal 110 to perform an initialization procedure upon waking up from the doze state. For this procedure, terminal 110 monitors the wireless channel for a time period equal to ProbeDelay after waking up. A typical value for ProbeDelay is 100 micro-seconds (μs). If terminal 110 detects transmission by other terminals during this monitoring period, then terminal 110 determines the amount of time requested by these other terminals for uplink transmission and sets a network allocation vector (NAV) to "busy" for this amount of time. If no other transmissions are detected during the monitoring period, then terminal 110 sets the NAV to zero and commences normal transmit operation after ProbeDelay. When operating in the power save mode, terminal 110 may perform the initialization procedure upon waking up from the doze state, regardless of whether the wakeup is due to an uplink transmission of an outgoing packet or beginning of the ON window for reception of a downlink packet.

For a frequency division duplexed (FDD) system, the downlink and uplink are allocated different frequency bands, and downlink and uplink transmissions can occur independently and simultaneously on the two frequency bands. For a time division duplexed (TDD) system, the downlink and uplink share the same frequency band, and downlink and uplink transmissions occur at different times on the shared frequency band. TDD is employed by IEEE 802.11 and various other networks.

Figure 7:
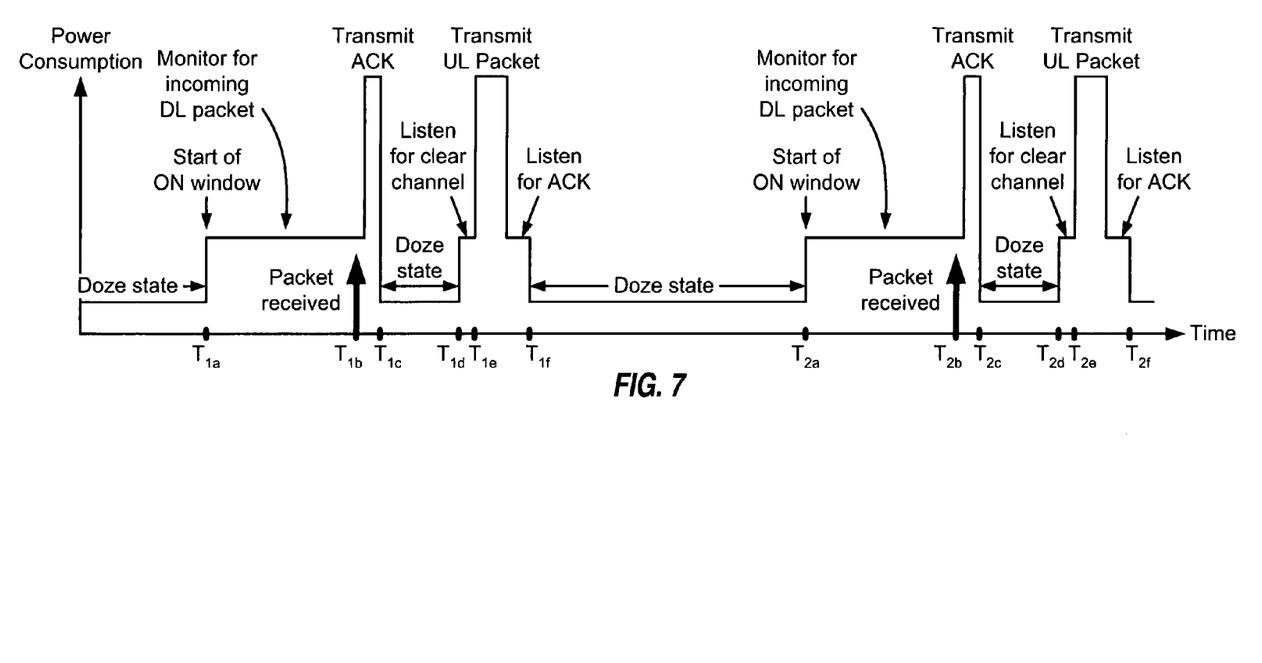
FIG. 7 shows data transmission and reception in the power save mode.

FIG. 7 shows data transmission and reception at terminal 110 in the power save mode for a TDD network. Terminal 110 receives an incoming packet on the downlink (DL) based on the ON window at times $T_{1a}$, $T_{1b}$, and $T_{1c}$, as described above for FIG. 6. At time $T_{1d}$, terminal 110 has a packet to transmit on the uplink (UL), wakes up from the doze state, enters the awake state, turns on the receiver, and listens for a clear wireless channel. After completing the initialization procedure and if the channel is clear, terminal 110 turns on the transmitter at time $T_{1e}$, transmits the outgoing packet on the uplink, and then listens for an ACK from access point 130. At time $T_{1f}$, terminal 110 receives an ACK from access point 130 for the uplink packet, determines the ON window for the next incoming packet, turns off the transmitter and receiver, and enters the doze state. Data transmission and reception for subsequent uplink and downlink packets occur in similar manner.

Data reception performance may be improved by accounting for the delay characteristics of various networks between PBX 150 and terminal 110. A network may handle different types of data (e.g., voice data and packet data) concurrently. Packet data may be bursty in nature whereas voice data may be more constant. The transmission of voice data is impacted whenever a large burst of packet data is sent.

Figure 8:
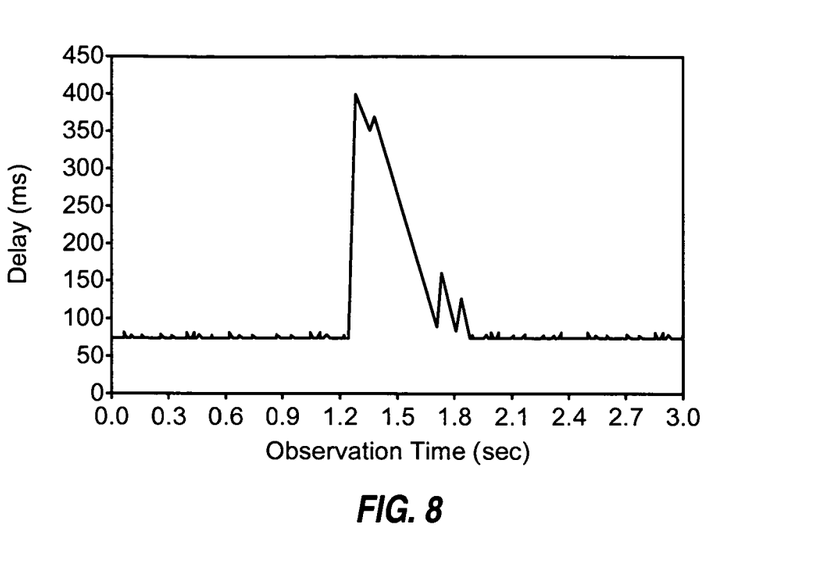
FIG. 8 shows a plot of jitter for packets sent via the Internet.

FIG. 8 shows a plot of delay or jitter for packets sent via Internet 140 over a three second observation period. The delay ($T_{delay}$) for a given packet is the difference between the time of arrival ($T_{rx}$) at a destination entity and the time of transmission ($T_{tx}$) at a source entity, or $T_{delay}=T_{rx}-T_{tx}$. The delays for packets received via Internet 140 are measured and plotted in FIG. 8. As indicated in FIG. 8, delay may remain nearly constant for a period of time and then spike up suddenly, e.g., due to a large burst of traffic. A delay spike may last between a few hundred milli-seconds to a few seconds. The power save mode may be operated in a manner to account for large and rapid fluctuations in network jitter.

In an embodiment, the power save mode is enabled and disabled based on network jitter, which is estimated based on the arrival times of incoming packets. If a large delay spike is detected, then the power save mode is disabled or deactivated, and terminal 110 operates in an always-on mode and continually monitors for incoming packets. Whenever low jitter is detected again, the power save mode is enabled, and terminal 110 powers on for a portion of the time to receive incoming packets.

Network jitter may be estimated as follows:

$$\text{Jitter\_est} = \max(abs(d[0]), abs(d[1]), \ldots, abs(d[\text{Num\_pac\_jit}-1])), \quad \text{Eq (8)}$$

where

Num_pac_jit is the number of packets used to estimate jitter;

abs (a) gives the absolute value of a; and

Jitter_est is an estimate of the network jitter.

The number of data packets used to estimate jitter may be the same or different than the number of data packets used to compute the window size. Num_pac_jit may be set to five or some other value. Equation (8) provides the time offset of the data packet that is received earliest or latest relative to its zero jitter point as the jitter estimate. This is a conservative (i.e., high) estimate of the network jitter.

Alternatively, network jitter may be estimated as follows:

$$\text{Std\_dev} = \sqrt{\frac{1}{\text{Num\_pac\_jit}} \cdot \sum_{x=0}^{\text{Num\_pac\_jit}-1} (d[x])^2} \,. \quad \text{Eq (9)}$$

Equation (9) provides a mean square estimate of the network jitter, which is equal to or less than the jitter estimate provided by equation (8). Network jitter may also be estimated in some other manner, e.g., based on an arithmetic mean, a geometric mean, and so on, of the time offsets for received packets.

Large jitter may be declared if the jitter estimate is greater than a high threshold. Correspondingly, low jitter may be declared if the jitter estimate is below a low threshold, which may be set lower than the high threshold to provide hysteresis. If the time interval between packets is 20 ms, then the high threshold may be set to 15 ms or some other value, and the low threshold may be set to 6 ms or some other value.

Figure 9:
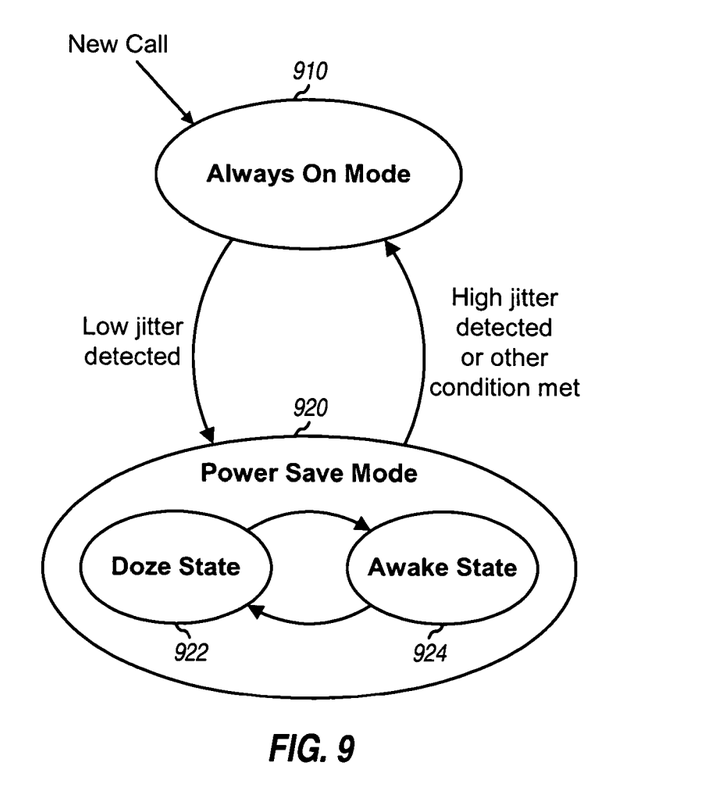
FIG. 9 shows an exemplary state diagram for the terminal.

FIG. 9 shows an exemplary state diagram for terminal 110. At the start of a new call, terminal 110 transitions to always-on mode 910. In mode 910, terminal 110 is always powered on and continually monitors for incoming packets. As packets are received, terminal 110 updates the jitter estimate and determines whether low jitter has been detected. Upon detecting low jitter, terminal 110 transitions to power save mode 920. In mode 920, terminal 110 transitions between doze state 922 and awake state 924 (e.g., based on the ON window) to receive incoming packets and transmit outgoing packets. Terminal 110 continues to update the jitter estimate as packets are received and determines whether high jitter has been detected. Terminal 110 transitions from power save mode 920 to always-on mode 910 upon detecting high jitter. Terminal 110 may also transition to always-on mode 910 if any one of the following conditions has occurred:

A handoff to another access point has been initiated.

Another entity (e.g., access point 130 or PBX 150) is aware of terminal 110 operating in the power save mode and directs the terminal to exit from this mode.

An incoming packet indicates that it has been retransmitted. The power save mode is disabled because the retransmission may be due to the original packet arriving before the ON window and was missed by terminal 110.

Access point 130 operates in a "scheduled" mode in which packets are sent to terminal 110 at designated times instead of a "regular" mode in which packets are sent as they are received by the access point.

The scheduled mode may be an IEEE 802.11 PCF (point coordination function) mode, which is defined by the IEEE 802.11 standard but is not often used. The regular mode may be an IEEE 802.11 DCF (distributed coordination function) mode, which is also defined by the IEEE 802.11 standard and is commonly used. The PCF and DCF modes are described in an IEEE 802.11 document entitled "Part 11: Wireless LAN Medium Access Control (MAC) and Physical Layer (PHY) Specifications," 1999, which is publicly available.

Figure 10:
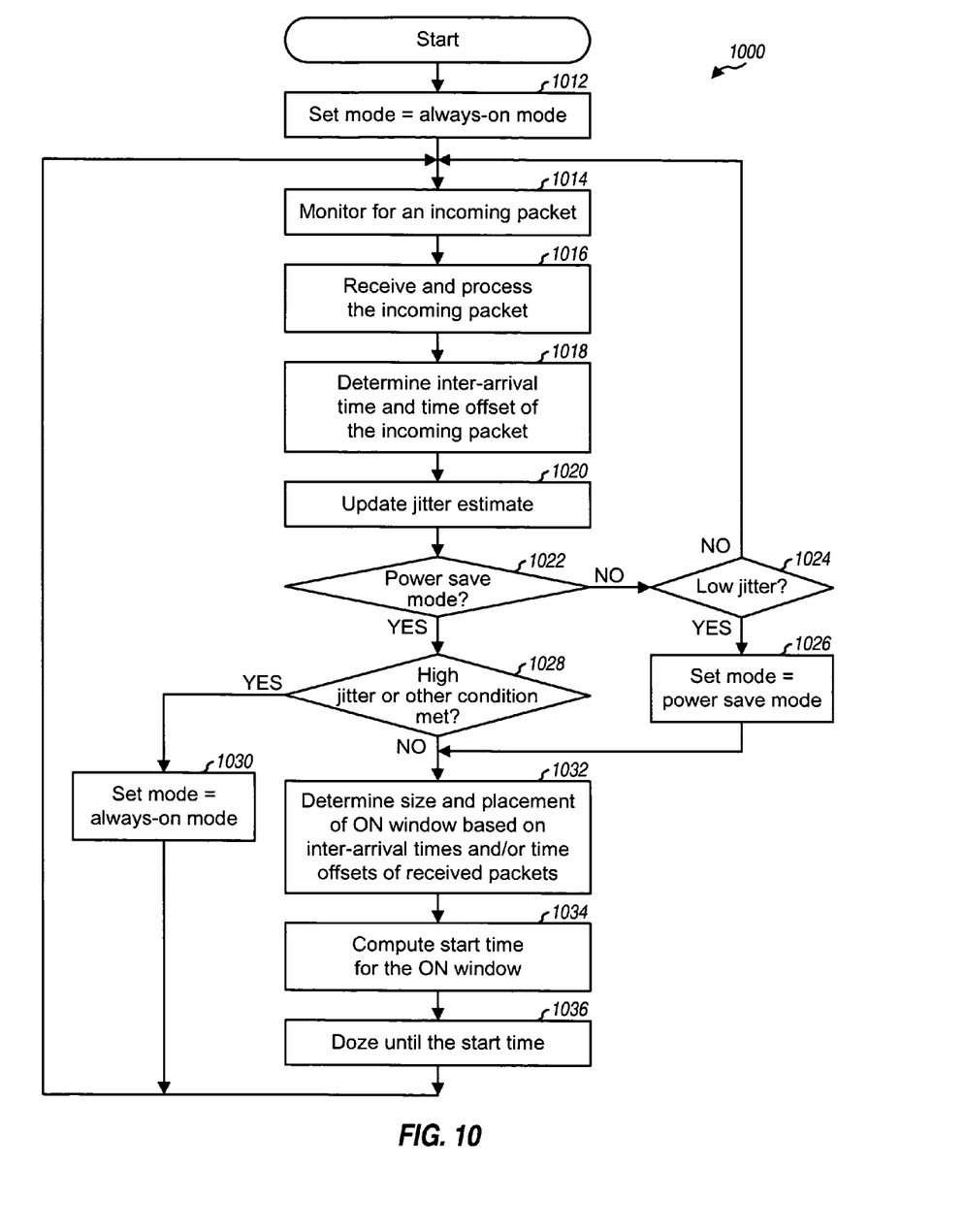
FIG. 10 shows a process for receiving packets in the power save mode.

FIG. 10 shows a flow diagram of a process 1000 for receiving packets in the power save mode. Initially (e.g., at the start of a new call), the operating mode of terminal 110 is set to the always-on mode (block 1012). Terminal 110 then monitors for an incoming packet (block 1014) and processes the packet upon receiving it (block 1016). Terminal 110 determines the inter-arrival time and/or time offset of the packet just received (block 1018) and updates the jitter estimate (block 1020).

A determination is then made whether terminal 110 is operating in the power save mode (block 1022). If the answer is 'no', which is the case at the start of the call, then a determination is made whether jitter is low (block 1024). If jitter is low, then the operating mode of terminal 110 is set to the power save mode (block 1026) and the process proceeds to block 1032. Otherwise, if jitter is not low, then the process returns to block 1014, and terminal 110 monitors for the next incoming packet.

If terminal 110 is operating in the power save mode (as determined in block 1022), then a determination is made whether jitter is high or another condition (e.g., any one of the four conditions enumerated above) for exiting the power save mode has been met (block 1028). If the answer is 'yes', then the operating mode of terminal 110 is set to the always-on mode (block 1030) and the process returns to block 1014. Otherwise, terminal 110 determines the size and placement of the ON window based on the inter-arrival times and/or time offsets of received packets (block 1032) and computes the start of the ON window, which is the start time for when the terminal should next wake up (block 1034). Terminal 110 then enters the doze state until the start time (block 1036) and thereafter transitions to block 1014 to monitor for the next incoming packet.

The techniques described herein may provide good data reception performance while reducing power consumption under many operating scenarios. For example, under low network traffic load and with parameters Min_size=3 ms and Num_pac=3, terminal 110 may be in the doze state for approximately 70% of the time without missing any incoming packet. Thus, substantial power saving may be achieved without any degradation in performance for low traffic load. Terminal 110 may autonomously operate in the power save mode without informing other network entities such as access point 130 and PBX 150. This simplifies operation in the power save mode.

The size and placement of the ON window may be determined such that terminal 110 is able to receive a large percentage of the incoming packets from access point 130. If an incoming packet arrives later than its expected arrival time, then data reception performance is the same for both the power save mode and the always-on mode. If an incoming packet arrives earlier than the start of the ON window, then terminal 110 will miss the packet. Access point 130 may retransmit the missed packet when an ACK is not received for the packet. Access point 130 may wait for a certain amount of time (which is often called a backoff window) before retransmitting the packet, and may double the backoff window after each failed retransmission. For IEEE 802.11, the retransmission process may be repeated up to 7 times and may span a total of about 80 ms. Since the ON window is guaranteed to occur every 20 ms, terminal 110 will be able to receive a retransmission, and the maximum extra delay an early packet will experience due to missed reception in the power save mode will be less than 20 ms. This extra delay for a packet that arrives early is acceptable, and the power save mode does not significantly degrade quality of service (QoS).

Figure 11:
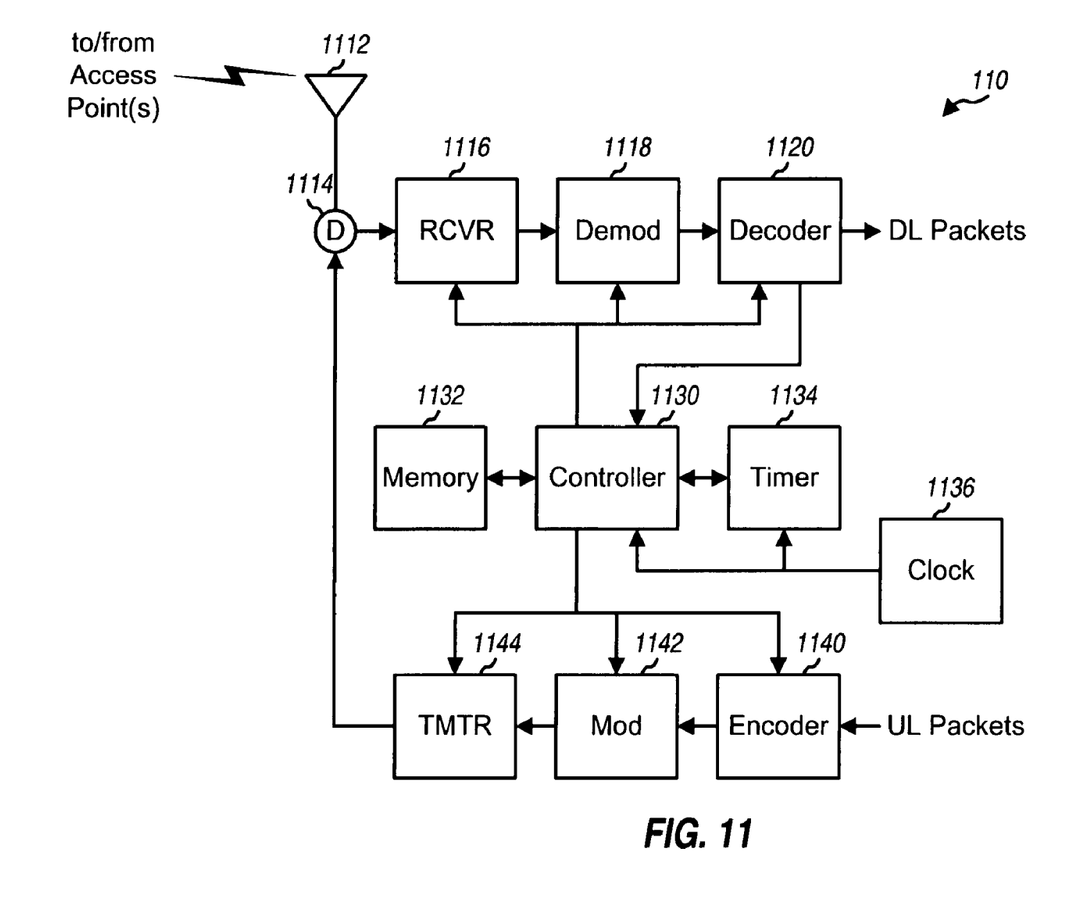
FIG. 11 shows a block diagram of the terminal.

FIG. 11 shows a block diagram of an embodiment of terminal 110. The downlink signal from access point 130 is received by an antenna 1112, routed through a duplexer (D) 1114, and provided to a receiver unit (RCVR) 1116. Receiver unit 1116 conditions (e.g., filters, amplifies, and frequency downconverts) the received signal, digitizes the conditioned signal, and provides data samples. A demodulator (Demod) 1118 demodulates the data samples in accordance with the modulation scheme used by wireless network 120 and provides demodulated data. A decoder 1120 then deinterleaves and decodes the demodulated data and provides decoded packets for the downlink. For a voice call, a vocoder (not shown in FIG. 11) receives the decoded packets and generates an analog signal, which is provided to a speaker. For the uplink, data to be transmitted by terminal 110 is encoded and interleaved by an encoder 1140, further modulated by a modulator (Mod) 1142, and conditioned (e.g., amplified, filtered, and frequency upconverted) by a transmitter unit (TMTR) 1144 to generate an uplink signal. The uplink signal is routed through duplexer 1114 and transmitted via antenna 1112 to access point 130.

A controller 1130 directs the operation of various units within terminal 110. Controller 1130 may receive various inputs such as the status of each received packet (good or erased), the time at which each packet was received, and so on. Controller 1130 may compute the inter-arrival time and time offset for each received packet, derive a jitter estimate, and determine whether or not to operate in the power save mode. If the power save mode is enabled, then controller 1130 determines the size and placement of the ON window for the next incoming packet, computes the start time when terminal 110 should wake up, and loads a timer 1134 with this start time. Controller 1130 may also initiate the transition to the doze state by sending control signals to shut down circuitry in the transmitter and receiver units and to start timer 1134. A clock unit 1136 generates a clock signal used to keep track of time. Timer 1134 counts down the loaded value using the clock signal from clock unit 1136 and provides an indication when the timer expires. Controller 1130 then provides control signals to power on the necessary circuitry in the receiver unit to enable reception of incoming packet. Controller 1130 also provides control signals to power on circuitry in the transmitter unit, if necessary. A memory unit 1132 stores data and program codes for controller 1130 and possibly other processing units.

For clarity, the power-efficient data reception techniques have been described for terminal 110 in communication with wireless network 120. In general, these techniques may be used for any wireless or wireline device for which power saving is desirable. For example, these techniques may be implemented in laptop PC 112, home PC 142, and so on.

The data reception techniques described herein may be implemented by various means. For example, these techniques may be implemented in hardware, software, or a combination thereof. For a hardware implementation, the processing units used to implement the power save mode and perform data reception may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the data reception techniques may be implemented with modules (e.g., procedures, functions, and so on) that perform the functions described herein. The software codes may be stored in a memory unit (e.g., memory unit 1132 in FIG. 11) and executed by a processor (e.g., controller 1130). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving data packets via a communication network, comprising:
    powering down a receiver circuitry prior to a window start time;
    determining an arrival time for a first data packet received, from a plurality of data packets received, via the communication network;
    determining the time difference, if any, between the first data packet arrival time and a second received data packet arrival time;
    determining a variable window size for a window of time during which the receiver circuitry is to be powered-on based on the time difference between the first and second data packet arrival times, wherein the window of time begins at the window start time, wherein the variable window size varies in order to accommodate arrival time jitter; and
    powering on the receiver circuitry for the duration of the window of time according to the window start time.

2. The method of claim 1, wherein the data packets are expected to be received at regular time intervals but encounter variable delay during transmission.

3. The method of claim 1, wherein the data packets are for a voice call.

4. The method of claim 1, further comprising:
    determining a time offset based on the time difference between the first and second data packet arrival times and an expected time interval between the packets.

5. The method of claim 4, wherein the variable window size is determined as:

$$Win\_size = Min\_size + \max(d[0],0) + \ldots + \max(d[Num\_pac-1],0),$$

where
    Mm size is a minimum window size;
    Num_pac is number of data packets used to compute the window size;
    d[x] is a time offset for data packet x;
    max (a, b) gives a maximum of arguments a and b; and
    Win_size is the variable window size.

6. The method of claim 4, wherein the window start time is determined as $$T_{start} = T_0 = T_{int} - Win\_size,$$

where
    $T_0$ is an arrival time of a current data packet that is received most recently via the communication network;
    $T_{int}$ is the expected arrival time for the next data packet relative to the arrival time of the current data packet;
    Win_size is the variable window size; and
    $T_{start}$ is the window start time.

7. The method of claim 1, wherein the variable window size is determined based on statistics of the arrival times of the data packets.

8. The method of claim 1, wherein the variable window size is determined based on standard deviation of the time difference between the first and second data packet arrival times.

9. The method of claim 1, wherein the communication network is an IEEE 802.11 wireless network.

10. An apparatus configured to receive data packets via a communication network, comprising:
    a controller configured to power down a receiver circuitry prior to a window start time, to determine an arrival time for a first data packet received, from a plurality of data packets received, via the communication network, configured to determine the time difference, if any, between the first data packet arrival time and a second received data packet arrival time, configured to determine a variable window size for a window of time during which the receiver circuitry is to be powered-on based on the time difference between the first and second data packet arrival times, wherein the window of time begins at the window start time, wherein the variable window size varies in order to accommodate arrival time jitter, and configured to power on the receiver circuitry for the duration of the window of time according to the window start time.

11. The apparatus of claim 10, wherein the data packets are expected to be received at regular time intervals but encounter variable delay during transmission.

12. The apparatus of claim 10, wherein the controller is further configured to determine a time offset based on the time difference between the first and second data packet arrival times and an expected time interval between the packets; and wherein the window start time is determined as:

$$T_{start} = T_0 = T_{int} - Win\_size,$$

where $T_o$ is an arrival time of a current data packet that is received most recently via the communication network;

$T_{int}$ is the expected arrival time for the next data packet relative to the arrival time of the current data packet;

Win_size is the variable window size; and $T_{start}$ is the window start time.

13. A terminal for receiving data packets via a communication network, comprising:

a controller configured to power down a receiver circuitry prior to a window start time, configured to determine an arrival time for a first data packet received, from a plurality of data packets received, via the communication network, configured to determine the time difference, if any, between the first data packet arrival time and a second received data packet arrival time, configured to determine a variable window size for a window of time during which the receiver circuitry is to be powered-on based on the time difference between the first and second data packet arrival times, wherein the window of time begins at the window start time, wherein the variable window size varies in order to accommodate arrival time jitter, and configured to power on the receiver circuitry for the duration of the window of time according to the window start time.

14. An apparatus configured to receive data packets via a communication network, comprising:

means for powering down a receiver circuitry prior to a window start time;

means for determining an arrival time for a first data packet received, from a plurality of data packets received, via the communication network;

means for determining the time difference, if any, between the first data packet arrival time and a second received data packet arrival time;

means for determining a variable window size for a window of time during which the receiver circuitry is to be powered-on based on the time difference between the first and second data packet arrival times, wherein the window of time begins at the window start time, wherein the variable window size varies in order to accommodate arrival time jitter; and means for powering on the receiver circuitry for the duration of the window of time according to the window start time.

15. The apparatus of claim 14, further comprising:

means for determining a time offset based on the time difference between the first and second data packet arrival times and an expected time interval between the packets, wherein the window start time is determined as:

$$T_{start} = T_0 + T_{int} - Win\_size,$$

where $T_O$ is an arrival time of a current data packet that is received most recently via the communication network;

$T_{int}$ is the expected arrival time for the next data packet relative to the arrival time of the current data packet;

Win_size is the variable window size; and $T_{start}$ is the window start time.

16. An integrated circuit, comprising:

circuitry configured to:

power down a receiver circuitry prior to a start time;

determine an arrival time of each data packet in a first plurality of data packets received via the communication network;

determine jitter in arrival times of a second plurality of data packets received via the communication network;

determine a variable window size for a window of time during which the receiver circuitry is to be powered-on based on the jitter, wherein the window of time begins at the start time, wherein the variable window size varies in order to accommodate arrival time jitter; and initiate powering on the receiver circuitry for the duration of the window of time according to the start time in order to monitor for the next data packet starting at the start time, wherein the monitoring for the next data packet starts at the start time if the jitter is below a threshold.

17. A method of receiving data packets via a communication network, comprising:

determining jitter in arrival times of a first and second plurality of data packets received via the communication network;

selecting a power save mode or an always on mode to monitor for a next data packet from the communication network with receiver circuitry, wherein the mode is selected based on the jitter;

if the power save mode is selected, determining a start time at which to start monitoring for the next data packet with the receiver circuitry based on the arrival times of the first and second data packets received via the communication network, and monitoring for the next data packet starting at the start time, wherein the start time is equal to an arrival time of a current data packet that is received most recently via the communication network plus the expected arrival time for the next data packet relative to the arrival time of the current data packet minus a variable window size for a window of time during which the receiver circuitry is to be powered-on; and if the always on mode is selected, monitoring for the next data packet with the receiver circuitry starting from a current data packet received most recently via the communication network.

18. The method of claim 17, further comprising:

transitioning from the power save mode to the always on mode if the jitter exceeds a high threshold; and transitioning from the always on mode to the power save mode if the jitter falls below a low threshold.

19. The method of claim 17, wherein the jitter is determined as a maximum of absolute values for time offsets for the second plurality of data packets, and wherein the time offset for each data packet is indicative of error between actual arrival time for the data packet and expected arrival time for the data packet.

20. The method of claim 17, wherein the jitter is determined based on mean square of time offsets for the second plurality of data packets, and wherein time offset for each data packet is indicative of error between actual arrival time for the data packet and expected arrival time for the data packet.

21. An apparatus configured to receive data packets via a communication network, comprising:
a controller configured to determine jitter in arrival times of a second plurality of data packets received via the communication network, configured to select a power save mode or a always on mode to monitor for a next data packet from the communication network, wherein the power save mode or the always on mode is selected based on the jitter, and, if the power save mode is selected, configured to determine a start time at which to start monitoring for the next data packet based on arrival times of a first plurality of data packets received via the communication network, wherein the start time is equal to an arrival time of a current data packet that is received most recently via the communication network plus the expected arrival time for the next data packet relative to the arrival time of the current data packet minus a variable window size for a window of time during which a receiver unit is to be powered-on; and
the receiver unit configured to monitor for the next data packet starting at the start time, if the power save mode is selected, and starting from a current data packet received most recently via the communication network, if the always on mode is selected.

22. An apparatus configured to receive data packets via a communication network, comprising:
means for determining jitter in arrival times of a second plurality of data packets received via the communication network;
means for selecting a power save mode or a always on mode to monitor for a next data packet from the communication network, wherein the power save or always on mode is selected based on the jitter;
means for, if the power save mode is selected, determining a start time at which to start monitoring for the next data packet based on arrival times of a first plurality of data packets received via the communication network, wherein the start time is equal to an arrival time of a current data packet that is received most recently via the communication network plus the expected arrival time for the next data packet relative to the arrival time of the current data packet minus a variable window size for a window of time during which receiver circuitry is to be powered-on; and
means for monitoring for the next data packet starting at the start time, if the power save always on mode is selected, and starting from a current data packet received most recently via the communication network, if the always on mode is selected.

23. A computer-readable medium, comprising storage memory having software instructions stored thereon, the software being executable by a processor, the software instructions, comprising:
instructions for causing a processor to power down a receiver circuitry prior to a window start time;
instructions for causing a processor to determine an arrival time of each data packet in a first plurality of data packets received via the communication network;
instructions for causing a processor to determine a start time at which to start monitoring for a next data packet from the communication network based on arrival times of the first plurality of data packets;
instructions for causing a processor to determine jitter in arrival times of a second plurality of data packets received via the communication network; and
instructions for causing a processor to monitor for the next data packet starting at the start time, wherein the monitoring for the next data packet starts at the start time if the jitter is below a threshold;
determining an arrival time for a first data packet received, from a plurality of data packets received, via the communication network;
determining the time difference, if any, between the first data packet arrival time and a second received data packet arrival time;
determining a variable window size for a window of time during which the receiver circuitry is to be powered-on based on the time difference between the first and second data packet arrival times, wherein the window of time begins at the window start time, wherein the variable window size varies in order to accommodate arrival time jitter; and
powering on the receiver circuitry for the duration of the window of time according to the window start time.

24. A computer-readable medium, comprising storage memory having software instructions stored thereon, the software being executable by a processor, the software instructions, comprising:
instructions for causing a processor to determine jitter in arrival times of a second plurality of data packets received via the communication network;
instructions for causing a processor to select a power save mode or an always on mode to monitor for a next data packet from the communication network, wherein the power save or always on mode is selected based on the jitter;
if the power save mode is selected, instructions for causing a processor to determine a start time at which to start monitoring for the next data packet based on arrival times of a first plurality of data packets received via the communication network, wherein the start time is equal to an arrival time of a current data packet that is received most recently via the communication network plus the expected arrival time for the next data packet relative to the arrival time of the current data packet minus a variable window size for a window of time during which receiver circuitry is to be powered-on; and
if the always on mode is selected, instructions for causing a processor to monitor for the next data packet starting from a current data packet received most recently via the communication network.

* * * * *